(12) United States Patent
Mueller et al.

(10) Patent No.: US 7,278,449 B2
(45) Date of Patent: Oct. 9, 2007

(54) SWITCH, ESPECIALLY FOR BRANCHING OFF BULK MATERIAL FLOWS

(75) Inventors: Robert Mueller, Daisendorf (DE); Franz-Josef Vogelsang, Ravensburg (DE)

(73) Assignee: Zeppelin Silo- und Apparatetechnik GmbH, Friedrichshafen (DE)

( * ) Notice: Subject to any disclaimer, the term of this patent is extended or adjusted under 35 U.S.C. 154(b) by 49 days.

(21) Appl. No.: 10/527,467

(22) PCT Filed: Aug. 2, 2003

(86) PCT No.: PCT/DE03/02605

§ 371 (c)(1),
(2), (4) Date: Apr. 28, 2005

(87) PCT Pub. No.: WO2004/026740

PCT Pub. Date: Apr. 1, 2004

(65) Prior Publication Data
US 2006/0162794 A1   Jul. 27, 2006

(30) Foreign Application Priority Data
Sep. 12, 2002  (DE) .............................. 102 42 499

(51) Int. Cl.
*F16K 11/08* (2006.01)
(52) U.S. Cl. ............... 137/625.47; 277/412; 277/432; 406/183

(58) Field of Classification Search ............... 137/246, 137/246.11–23, 625.46, 625.47, 876; 277/411, 277/412, 418, 419, 420, 431; 406/182, 183; 251/304
See application file for complete search history.

(56) References Cited

U.S. PATENT DOCUMENTS 4,022,424 A * 5/1977 Davis et al. ................. 251/214
4,635,674 A * 1/1987 Bajka ..................... 137/246.22

(Continued)

FOREIGN PATENT DOCUMENTS

DE          986 047          3/1956

(Continued)

*Primary Examiner*—John Fox
(74) *Attorney, Agent, or Firm*—Breneman & Georges; William D. Breneman

(57) ABSTRACT

The invention relates to a switch for branching off bulk material flows, the switch includes a rotary plug (1) which is arranged in a fixed housing having preferably three connection openings. In a first position the plug establishes a connection between a first pair of connection openings and, by rotation into a second position, establishes a connection between a second pair of connection openings, a gap being provided between the rotary plug (1) and the housing in such a way as to arrange the rotary plug (1) in the housing in a non-contact manner without any additional contact sealing elements. The plug (1) and/or said housing includes at least one labyrinth sealing arrangement (7).

11 Claims, 5 Drawing Sheets

U.S. PATENT DOCUMENTS

Figure 1:
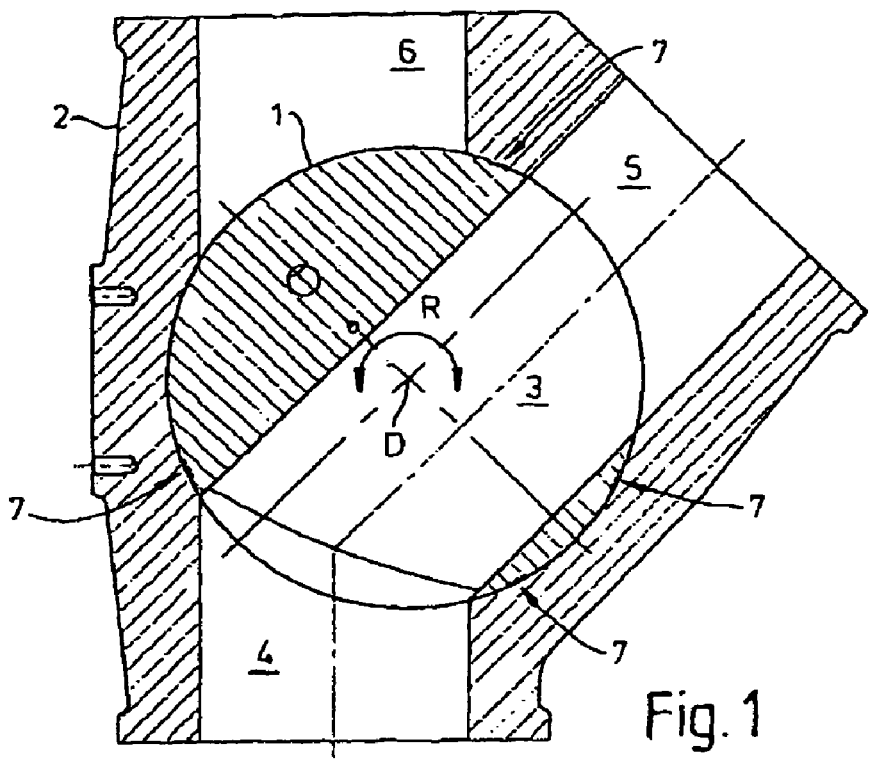

| | | | |
|---|---|---|---|
| 4,702,269 A | * 10/1987 | Schuler | 137/246.12 |
| 5,181,580 A | * 1/1993 | Burg | 180/116 |
| 5,226,759 A | * 7/1993 | Hilmer et al. | 406/182 |
| 5,375,622 A | * 12/1994 | Houston | 137/240 |
| 5,524,579 A | * 6/1996 | Eluchans | 123/79 R |
| 5,529,758 A | * 6/1996 | Houston | 422/171 |

FOREIGN PATENT DOCUMENTS

| | | |
|---|---|---|
| DE | 30 07 286 A1 | 9/1981 |
| DE | 39 22 240 C2 | 1/1991 |
| DE | 41 14 949 C1 | 10/1992 |
| DE | 197 02 215 A1 | 7/1998 |
| DE | 44 25 344 C2 | 5/2001 |
| DE | 199 52 435 A1 | 5/2001 |
| EP | 1 236 664 A2 | 9/2002 |
| GB | 2 198 500 A | 5/1988 |

* cited by examiner

SWITCH, ESPECIALLY FOR BRANCHING OFF BULK MATERIAL FLOWS

BACKGROUND OF THE INVENTION (1) Field of the Invention

The invention relates to a diverter switch, in particular a single-channel diverter switch, for branching off bulk-material flows, having a rotary plug which is arranged in a stationary housing preferably comprising three connecting openings. More particularly the invention pertains to a novel labyrinth seal having one labyrinth seal groove with a rotary plug disposed around at least one opening of a through channel in which the labyrinth seal groove is arranged around at least one of the connecting openings.

(2) Description of the Related Art Including Information Disclosed Under 37 C.F.R. 1.97 and 1.98

Numerous different variants of diverter switches, in particular single-channel diverter switches or plug diverter switches, are already known. They generally have the task of feeding the bulk material to be conveyed to various pipelines by deflecting the conveying direction, a conveying gas in particular being used for conveying the bulk material.

In a corresponding diverter switch according to publication DE 39 22 240 C2, a cylindrical rotary plug is used, in which the inlet side and outlet side of the through-channel are transposed by the adjustment or rotation from a first position into a second position. In this case, flow occurs through the through-channel of the rotary plug in the second position against the direction of flow of the conveying fluid in the first position. The through-channel is arranged essentially perpendicularly to the rotation axis of the cylindrical rotary plug and often has a virtually round free cross section.

In corresponding single-channel diverter switches, depending on the length of the conveying path downstream of the deflection or downstream of the valve, considerable pressure differences can partly occur between the two outflow channels. Corresponding diverter switches normally have elastic seals in order to minimize leakages which occur. In this case, the leakages depend, inter alia, on the pressure of the conveying fluid or transport gas in comparison with the atmospheric ambient pressure and also on the above-mentioned pressure differences between the outflow channels.

Corresponding seals may be accommodated in the diverter switch housing or in the rotary plug. For example, these seals are designed as inflatable seals or as static seals, in particular provided with a special profile shape, which press automatically against the mating body when pressure builds up in the conveying line.

The publication DE 199 52 435 A1 discloses a switch for bulk material with an inlet channel and at least two outlet channels, it being possible with the aid of a rotary plug for the inlet channel to be optionally connected to one of the outlet channels. For sealing, the rotary plug has an elastomer seal.

In addition, diverter switches with a flap are also known (cf. DE 96 80 47). As a difference from rotary plugs, flaps have two mutually separate through-regions, to connect the inlet optionally to the two outlet channels. Consequently, a comparatively thin directing element which can swing back and forth between two positions is necessarily provided between the two through-regions. By contrast, a rotary plug of the generic type for diverter switches has only one through-channel, which, for connecting the inlet channel to the two outlet channels to be selected, must be adjusted in such a way that the direction of through-flow in the individual through-channel is reversed for the two positions.

A disadvantage with corresponding sealing systems, however, is that seal wear may occur, the corresponding seals being partly abraded. Since the seal material normally cannot be made of the same material as the bulk material to be conveyed, the abrasion of the seal leads to contamination of the material to be conveyed. In the case of very high-grade materials to be conveyed, or materials to be conveyed which are of very high purity, this abrasion is disadvantageous or even inadmissible. Used for such special applications are diverter switches which have as narrow a gap as possible between the plug and the housing in order thus to reduce the leakage losses.

In terms of construction, very high demands are made on the accuracy and guidance of the components, so that the established gap is retained in all operating states and material contact and possibly seizing or abrasion does not occur. The realization of comparatively narrow gaps between the plug and the housing therefore requires the plug and also the housing to be produced in a very complicated manner to close tolerances, which leads to economically unfavourable production of corresponding diverter switches.

In addition, the gaps which can currently be realized lead to unacceptable leakage losses in particular in plug diverter switches working under relatively high pressure differences. This may lead, for example, to malfunctions in the conveying operation, which has to be compensated for at considerable cost, if need be by additional, metered feeding of conveying gas directly downstream of the diverter switch. Sealing closure members connected downstream will possibly be necessary in the case of corresponding diverter switches, which likewise leads to an increase in the cost.

BRIEF SUMMARY OF THE OBJECT AND ADVANTAGES OF THE INVENTION

Against this background, the object of the invention is to propose a diverter switch for branching off bulk-material flows which does not have the disadvantages of the prior art and permits optimum sealing of the rotary plug even without additional contact sealing elements.

Starting from a diverter switch of the type mentioned at the beginning, this object is achieved by a diverter switch and more particularly a single channel diverter switch having a rotary plug disposed in a housing having connecting openings and a labyrinth seal groove disposed around a through channel in which the labyrinth seal groove is arranged around one of the connecting openings.

Advantageous embodiments and developments of the invention are possible by utilizing at least one labyrinth seal groove, a plurality of labyrinth seal grooves disposed next to one another, a rotary plug and preferably a cylindrical rotary plug arranged around at least one through channel, a labyrinth seal groove disposed continuously around one of the connecting openings, at least one feed channel, a feed opening, pressure differential between the gap fluid and conveying fluid utilizing the same fluid for the gap fluid and the conveying fluid and utilizing a gap that is smaller than or equal to 0.5 mm and is preferably smaller than or equal to 0.3 mm.

Accordingly, the diverter switch according to the invention is characterized in particular by the fact that the rotary plug and/or the housing has at least one labyrinth seal arrangement comprising at least one labyrinth seal groove.

In a special variant of the invention, the labyrinth seal groove of the rotary plug is arranged largely continuously around at least one opening of the through-channel. In special applications, a labyrinth seal groove which is interrupted at least once and is generally arranged around the opening of the through-channel is conceivable; for example, particular sections of the rotary plug are realized with additional, corresponding labyrinth seal grooves. An advantage with these variants of the invention is that only two labyrinth seal arrangements, i.e. in each case one arrangement per opening of the through-channel, is required for realizing a fully sealed-off single-channel diverter switch.

Alternatively, or in combination with the aforesaid variants of the invention, the labyrinth seal groove of the housing may be arranged largely continuously around at least one of the connecting openings. In accordance with the aforesaid variants, is a labyrinth seal groove interrupted at least once or designed so that it is not closed is also conceivable in this case, this labyrinth seal groove possibly being additionally arranged at particular sections of the housing.

By means of a labyrinth seal arrangement according to the invention, a non-contact seal can advantageously be realized between the rotary plug and the housing, i.e. without an additional, separate seal, which is subjected to abrasion, being used in the process. In contrast to a contact seal, in which the seal surfaces touch one another and are generally pressed against one another, contact between the sealing surfaces is completely prevented in the case of a non-contact seal. On the contrary, according to the invention, the sealing effect is realized by the flow resistance of the substance to be sealed off by means of the free gap with labyrinth seal arrangement.

In a labyrinth seal arrangement or a labyrinth-gap seal arrangement, the pressure of the fluid in a chamber, widened section, recess or the like is advantageously reduced by vortex formation and throttling, a factor which, for example, in a labyrinth seal comprising a plurality of chambers, leads to the gradual pressure drop from chamber to chamber.

If need be, the labyrinth seal arrangement can be formed by an integrally formed portion, coating, inlay, etc., which is preferably made of the material of the rotary plug or housing or of a comparable material. In this case or otherwise, in a preferred embodiment of the invention, the labyrinth seal arrangement is designed as a recess, chamber, in particular as the labyrinth seal groove, in the rotary plug or housing. By means of an appropriate recess or groove, the seal according to the invention can be realized without a further, separate, or additional seal component. In this case, it is advantageous that, in an especially simple manner, with a contact seal element being dispensed with, it is absolutely certain that contamination or impairment of the bulk-material flow or conveying fluid cannot occur, and at the same time an advantageous sealing effect can be realized. According to the invention, the housing is thereby effectively sealed off relative to the rotary plug, so that leakages can be decisively reduced or completely or virtually prevented.

A plurality of labyrinth seal grooves arranged next to one another are advantageously provided. For example, about three to ten or more seal grooves are provided per seal. Each groove leads to a pressure drop, so that the sealing effect is improved with increasing number of grooves. The number of seal grooves is advantageously adapted to the cost of realizing corresponding grooves.

In an advantageous embodiment of the invention, the housing is designed in such a way that it has in each case at least one labyrinth seal arrangement around each connecting opening. In these embodiments, there are therefore at least three corresponding labyrinth seal arrangements, so that at least two labyrinth seal arrangements are provided between two connecting openings. In this case, the third connecting opening, which is not involved in the conveying operation, is also additionally sealed off in an advantageous manner, so that the sealing effect in particular between the corresponding connecting openings is further improved, which additionally increases the operating reliability of the diverter switch according to the invention.

In a special development of the invention, at least one feed opening of a feed channel for feeding a suitable gap fluid into the region of the gap is provided. The diverter switch can be advantageously flushed by feeding a gap fluid into the gap between housing and plug. For example, gap fluid is fed to the gap at least in a rotary or adjusting phase of the rotary plug. Gap fluid can possibly be fed to the gap almost continuously and/or during the entire conveying operation.

By the feeding of the gap fluid into the gap according to the invention, relatively fine material to be conveyed, for example, can be advantageously transported or blown back from the region between rotary plug and housing into the through-channel or into a conveying channel arranged at a connecting opening. By means of this measure, an outflow of the conveying fluid and/or escape of some of the bulk-material flow is prevented to the greatest possible extent. A corresponding feed opening for feeding a gap fluid into the region of the gap is generally advantageous in a diverter switch according to claim 1.

In an advantageous embodiment of the invention, the labyrinth seal groove has the feed opening. By this measure, the labyrinth seal groove is designed as a distributing groove for distributing the gap fluid at least over the entire length of the groove or advantageously around the circumference of the opening of the through-channel or around the connecting opening.

A pressure of the gap fluid is advantageously greater than a pressure of the conveying fluid, so that it can be ensured that no conveying fluid or bulk material can pass through the gap into the intermediate space between housing and rotary plug.

If need be, the gap fluid essentially comprises an inert or less active substance. For example, the gap fluid used is commercially available nitrogen or the like.

In a special development of the invention, a composition of the gap fluid essentially corresponds to a composition of the conveying fluid. By means of this measure, contamination of the conveying fluid and/or of the bulk-material flow to be conveyed is advantageously ruled out to the greatest possible extent.

Numerous feed openings at a distance from one another can preferably be arranged around a connecting opening and/or an opening of the through-channel. For example, a labyrinth seal groove comprises an appropriately large number of feed openings. In principle, by means of an appropriate feed of a gap fluid into the region of the gap, a fluid curtain or the like for screening off or sealing off the gap to the greatest possible extent can be realized.

In a preferred embodiment, a maximum width of the gap between housing and rotary plug is smaller than or equal to $5/10$ths of a millimeter, preferably smaller than or equal to $3/10$ths of a millimeter. Especially in combination with the labyrinth seal arrangement according to the invention, it has been found in practice that a corresponding gap represents an especially advantageous embodiment of the invention.

Exemplary Embodiment

An exemplary embodiment of the invention including best mode is shown in the drawing and explained in more detail below with reference to the figures.

BRIEF DESCRIPTION OF THE SEVERAL VIEWS OF THE DRAWING(S)

Figure 2:
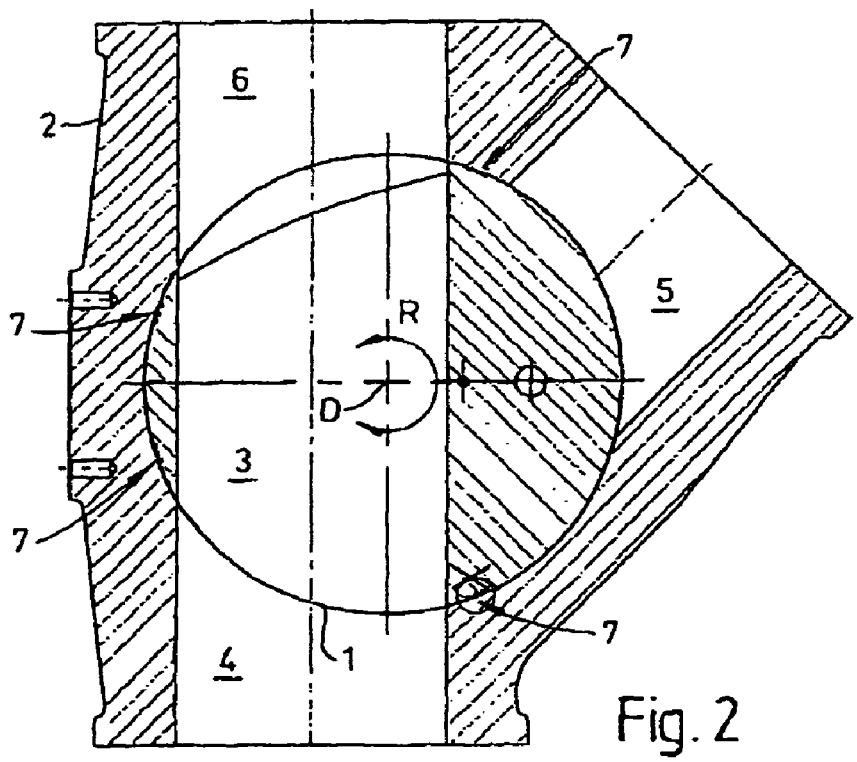
Figure 3:
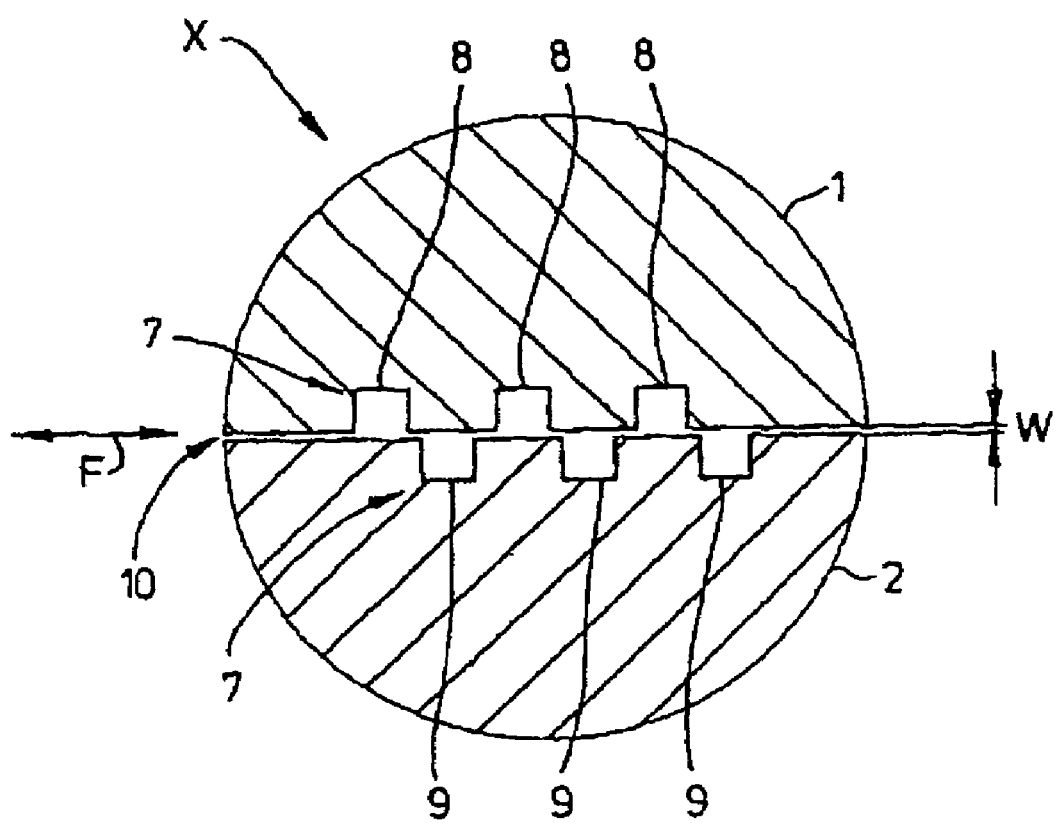
Figure 4:
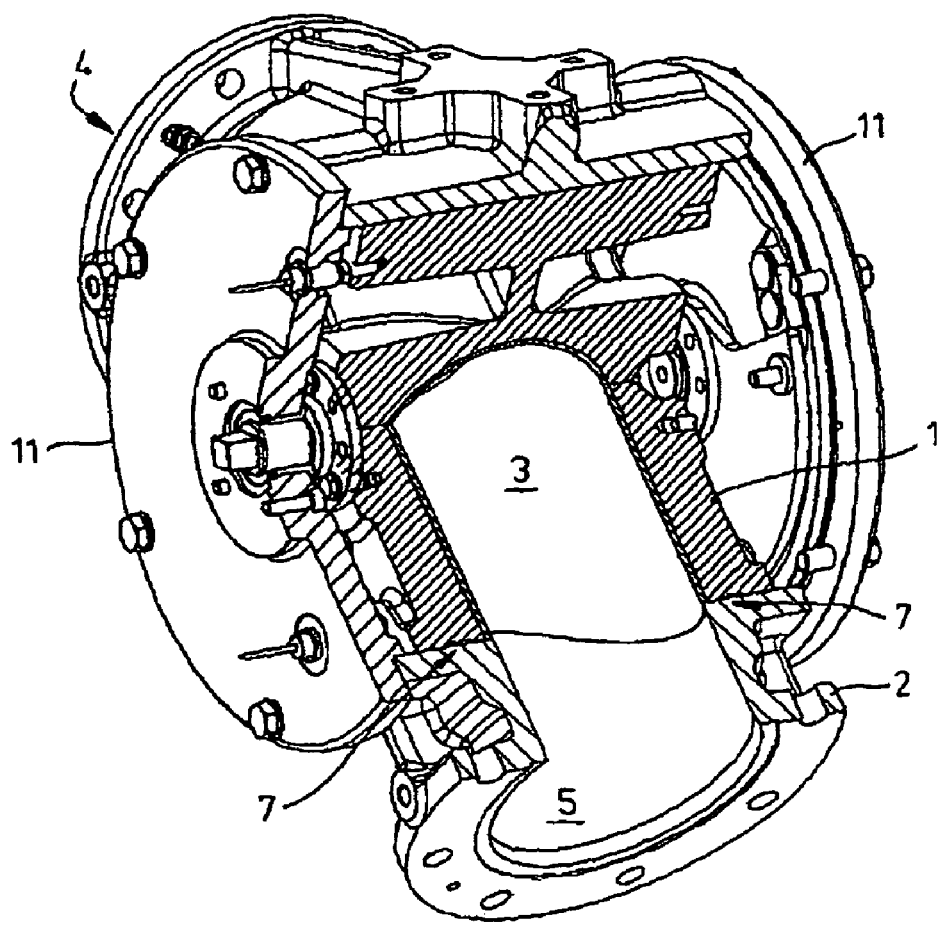
Figure 5:
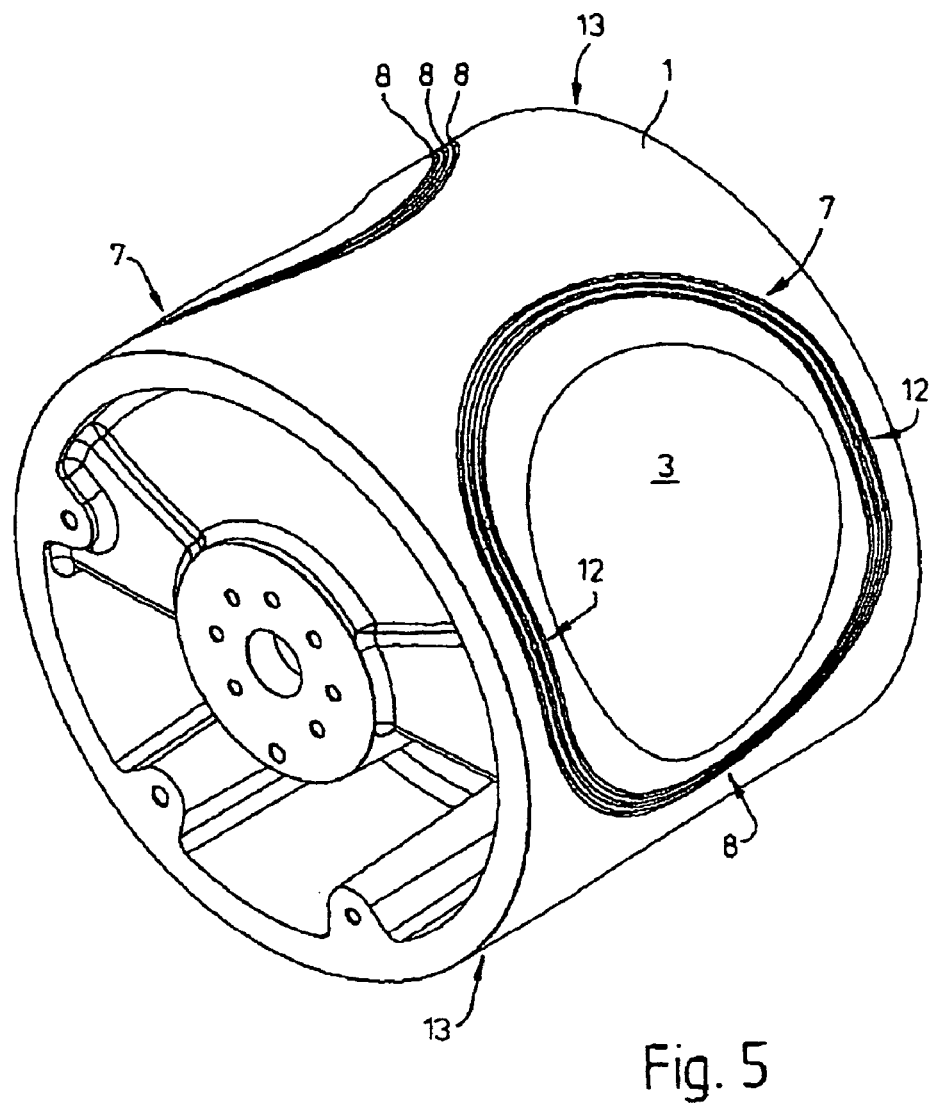
Figure 6:
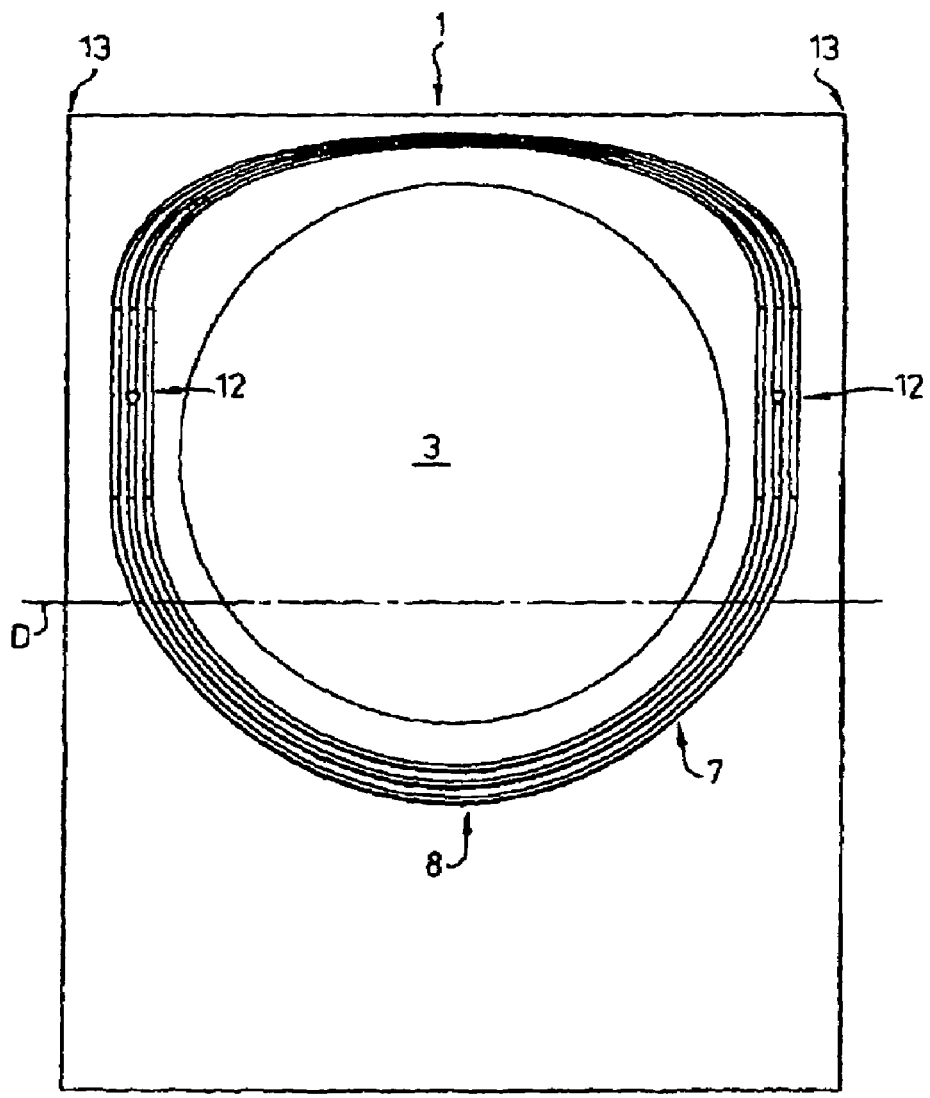

In the drawing, in particular:

FIG. 1 shows a schematic sectional representation through a single-channel diverter switch according to the invention in a first position, FIG. 2 shows a schematic sectional representation of the single-channel diverter switch according to the invention in a second position, FIG. 3 shows a schematic, enlarged detail of a labyrinth seal according to the invention, FIG. 4 shows a schematic, perspective, partly sectioned representation of the single-channel diverter switch according to the invention, FIG. 5 shows a schematic, perspective representation of a rotary plug according to the invention, and FIG. 6 shows the rotary plug according to FIG. 5 in plan view.

DETAILED DESCRIPTION OF THE INVENTION INCLUDING BEST MODE

A single-channel diverter switch according to the invention, having a cylindrical rotary plug 1 and a correspondingly adapted housing 2, is presented in FIG. 1 in a sectioned representation. Instead of a cylindrical rotary plug in the cylindrical housing, another adapted shape, such as a spherical shape for example, may also be used. The rotary plug 1 is located in a first position, so that a passage by means of a channel 3 is realized from a first connecting line 4 to a second connecting line 5.

A second position of the cylindrical rotary plug 1 according to the invention is shown in FIG. 2, the channel 3 permitting a connection between the connecting line 4 and a third connecting line 6. The cylindrical rotary plug 1 is adjusted by means of a rotation about a rotation axis D arranged essentially perpendicularly to the channel 3, it being possible for the rotary plug 1 to rotate in directions of rotation R.

According to the invention, the cylindrical housing 2 and/or the cylindrical rotary plug 1 comprises a labyrinth seal arrangement 7. For reasons of clarity, only the rotary plug 1 with the seal 7 according to the invention is presented in FIGS. 1 and 2.

On the other hand, schematically shown in the detail "X" in FIG. 3 is an embodiment in which both the rotary plug 1 and the housing 2 have a labyrinth seal 7. It becomes clear with the aid of FIG. 3 that the seal 7 presented in each case consists of three grooves 8 or 9, respectively. The grooves 8 of the rotary plug are advantageously staggered relative to the grooves 9 in the direction of flow F. An arrangement in which the grooves 8 and 9 are arranged opposite one another is likewise conceivable.

In addition, it becomes clear in FIG. 3 that the rotary plug 1 is at a distance from the housing 2 and as a result a gap 10 realized between housing 2 and rotary plug 1 and having a gap width W is formed. A conveying gas (not shown in any more detail) flows according to arrow F into the gap 10 and is swirled by means of the grooves 8, 9, so that a non-contact seal 7 is advantageously realized.

According to FIG. 4, the single-channel diverter switch is presented in a perspective, partly sectioned representation.

Here, it becomes clear that the single-channel diverter switch has two side covers 11, in particular for mounting the rotary plug 1. If need be, a seal (not shown in any more detail) which is possibly also elastic may be provided between at least one side cover 11 and the housing 2 and/or the rotary plug 1. Alternatively, or in combination with this, at least one side cover 11 may be sealed off relative to the housing 2 and/or the rotary plug 1 by means of a labyrinth seal 7 according to the invention.

The three-dimensional design of the rotary plug 1 including the two seals 7 for sealing off the openings of the through-channel 3 is illustrated in FIG. 5. The grooves 8 of the seals 7 can be produced, for example, by means of a cutting, abrasive or comparable process in a comparatively simple manner, preferably by means of electronically controllable machine tools.

According to FIG. 5, a centre groove 8 of the seal 7 has two flushing openings 12, through which a flushing fluid or commercially available nitrogen can be introduced into the gap 10 by means of a flushing channel (not shown in any more detail) of the rotary plug 1. In this way, in particular the centre groove 8 is designed as a distributing channel for distributing the flushing fluid around the opening of the through-channel 3 of the rotary plug 1.

In general, the grooves 8 or 9, as shown, may be designed as continuous grooves 8, 9 or, in a manner not shown in any more detail, as grooves 8, 9 which are interrupted at least once.

FIG. 6 shows the rotary plug 1 in plan view. For example, the grooves 8 and/or 9, as in FIGS. 5, 6, are arranged concentrically to one another.

In a manner not shown in any more detail, further seals may be provided, for example, in the marginal region 13 of the lateral surface of the rotary plug 1, between the seals 7 of the rotary plug, between the seals 7 of the housing 2, etc. It is also conceivable to realize a sealing system or the like by means of a network of grooves 8, 9 or the like arranged on the housing 2 and/or the rotary plug 1.

A seal variant encloses the plug laterally at the circumference and avoids the overflow of the conveying gas into the region of the lateral cover, so that leakages occur only via the gap at the plug circumference; another variant encloses the respective conveying channels completely.

The invention is not restricted to the exemplary embodiment shown and described. On the contrary, it also comprises all variants within the scope of the patent claims.

LIST OF DESIGNATIONS

1 Rotary plug
2 Housing
3 Channel
4 Connecting line
5 Connecting line
6 Connecting line
7 Seal
8 Groove
9 Groove
10 Gap
11 Side cover
12 Gap opening
13 Margin
D Rotation axis
F Direction of flow
R Direction of rotation
W Gap width
X Detail

What is claimed is:

1. A diverter switch for branching off bulk-material flows, having a rotary plug (1) disposed in a stationary housing (2) having three connecting openings (4, 5, 6) said rotary plug and housing providing a first position connecting a first connecting-opening pair (4, 5) a second position, connecting a second connecting-opening pair (4, 6), and a gap (10) disposed between said rotary plug (1) and said housing wherein the improvement comprises a rotary plug (1) and/or housing (2) having at least one labyrinth seal arrangement (7), having at least one labyrinth seal groove (8, 9), wherein the labyrinth seal groove (8) of the rotary plug (1) is arranged largely continuously around at least one opening of a through-channel (3) and is axially displaced from an end of said through-channel, and/or the labyrinth seal groove (9) of the housing (2) is arranged largely continuously around at least one of the connecting openings (4, 5, 6) and is axially or radially displaced from an end of a connecting opening of said housing and the gap (10) has a maximum width (W) smaller than or equal to five-tenths of a millimeter (W $\leq 5/10$ mm).

2. The diverter switch according to claim 1, further comprising a plurality of labyrinth seal grooves (8, 9) arranged next to one another.

3. The diverter switch according to claim 1 or 2 further comprising at least one feed opening (12) for a feed channel for feeding a gap fluid into the gap (10) between rotary plug (1) and housing (2).

4. The diverter switch according to claim 1 or 2 further comprising a feed opening (12) in the labyrinth seal groove (8, 9).

5. The diverter switch according to claim 1 or 2 further comprising means for insuring a pressure of a gap fluid is greater than a pressure of a conveying fluid.

6. The diverter switch according to claim 1 or 2 wherein the composition of a gap fluid is substantially the same as the composition of a conveying fluid.

7. The diverter switch of claim 1 or 2 wherein the maximum width (W) of the gap 10 is smaller than or equal to three-tenths of a millimeter (W $\leq 3/10$ mm).

8. A fluid diverter device comprising:
(a) a housing having a plurality of through channels and a seat for a rotatable plug;
(b) a rotatable plug disposed in said seat selectively rotatably interconnecting at least one of said plurality of through channels;
(c) a labyrinth seal having a plurality of grooves disposed on said rotatable plug and disposed on said housing, said plurality of sealing grooves displaced axially or radially from an end of one of said plurality of through channels and disposed between said housing and said rotatable plug; and
(d) a fluid gap seal disposed intermediate said housing and said rotatable plug in communication with said plurality of sealing grooves of said labyrinth seal.

9. The fluid diverter of claim 8 further comprising at least one feed channel in communication with said fluid gap seal.

10. The fluid diverter of claim 9 further comprising means for increasing the pressure of the gap fluid to a pressure greater than the conveying fluid.

11. The fluid diverter of claim 10 wherein said plurality of grooves disposed on said rotatable plug and said plurality of grooves disposed on said housing are concentrically staggered.

* * * * *